(12) United States Patent
Hori

(10) Patent No.: US 6,246,532 B1
(45) Date of Patent: Jun. 12, 2001

(54) OPTICAL PICKUP COMPRISING A DAMPER BASE HAVING AN OVAL HOLE

(75) Inventor: Ken-ichi Hori, Kawasaki (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/448,791

(22) Filed: Nov. 23, 1999

(30) Foreign Application Priority Data

Nov. 27, 1998 (JP) .................................................. 10-337509

(51) Int. Cl.[7] ...................................................... G02B 7/02
(52) U.S. Cl. ............................................. 359/813; 359/823
(58) Field of Search .................................... 359/813, 814, 359/822, 823, 824; 369/44.14, 44.15, 44.16, 247

(56) References Cited

U.S. PATENT DOCUMENTS

| 5,220,459 | 6/1993 | Ichikawa et al. . |
| 5,488,594 | 1/1996 | Kobayashi et al. . |
| 5,598,397 | 1/1997 | Sim . |
| 5,724,337 | 3/1998 | Kawano et al. . |
| 6,016,292 | * 1/2000 | Lee ..................................... 369/44.15 |

FOREIGN PATENT DOCUMENTS 0 704 842 A1   4/1996   (EP) .

* cited by examiner

*Primary Examiner*—Georgia Epps
*Assistant Examiner*—Saeed Seyrafi
(74) *Attorney, Agent, or Firm*—Frishauf, Holtz, Goodman, Langer & Chick, P.C.

(57) ABSTRACT

In an optical pickup comprising an object lens a lens holder for holding the object lens, a damper base for supporting the lens holder through a plurality of suspension wires to allow the lens holder to shift up and down and right and left, and an actuator base including a supporting block for fixedly supporting the damper base by using a screw, the damper base has an oval hole which allows the screw to pass therethrough.

3 Claims, 6 Drawing Sheets

OPTICAL PICKUP COMPRISING A DAMPER BASE HAVING AN OVAL HOLE

BACKGROUND OF THE INVENTION

This invention relates to an optical pickup for recording/reproducing data in/from an optical recording medium such as an optical disc, a damper base for use in the optical pickup, and an adjustment method for adjusting the damper base.

In the manner known in the art, an electric equipment such as a personal computer is connected to various peripheral units one of which comprises a memory device or a recording medium. In addition, there is various types of memory devices (recording media). In other words, the memory devices (recording media) are classified into removable media and non-removable media. On of the removable media comprises a compact disc-recordable (CD-R). The compact disc-recordable is an audible recording medium which is compatible with a compact disc read only memory (CD-ROM) or a compact disc-digital audio (CD-DA). Although to write information (data) in the CD-R requires an exclusive apparatus or a CD-R drive and a writing application, to read the information (data) from the CD-R may be carried out by using a CD-ROM drive. Although it is impossible to cancel the date once written, it is possible to frequently add data.

Various other removable media are already known. A compact disc-rewritable (CD-RW) is a compact disc which is capable of erasing data therefrom and of rewriting data therein many times.

Now, in order to write information (data) in the CD-R or the CD-RW and to read the information (data) from the CD-R or the CD-RW demands a recording/reproducing optical pickup requires for irradiating a laser beam on the CD-R or the CD-RW.

In general, the optical pickup of the type described comprises a laser optical source for outputting the laser beam and an optical system for guiding the outputted laser beam to a recording medium such as an optical disc. As described above, it is possible for the CD-R and the CD-RW to carry out not only reading of information but also writing of information. In the optical pickup for the CD-R and the CD-RW, it is necessary to change output or power of the laser beam outputted by the laser optical source either on reading of information or on writing of information. This is because writing of information is carried out by forming a pit in a recording layer of the optical disc by irradiating of the laser beam. Accordingly, the output of the laser beam on writing of information is larger than that on reading of information and is, for example, ten to twenty times as large as that on reading of information.

The optical pickup comprises an object lens, a lens holder for holding the object lens, a damper base for shiftably supporting up and down and right and left the lens holder through a plurality of suspension wires, and actuator base including a supporting block for fixedly supporting the damper base by using a screw.

In the manner which will later be described in conjunction with FIG. 5, a conventional damper base has a circular hole which merely allows the screw to pass therethrough. With this structure, it is possible to correct an angular displacement of the object lens in a radial direction in regard to an optical axis by fastening the damper base to the supporting block with the damper base suitably rotated about the screw.

The above-mentioned damper base merely can adjust an angle of the object lens in the radial direction in regard to the optical axis. However, it is actually necessary not only to correct the angular displacement of the object lens in the radial direction that occurs on assembling and so on but also to correct a position displacement of the object lens in the radial direction. This assemble requires a precision of about tens of microns.

SUMMARY OF THE INVENTION

It is therefore an object of this invention to provide an optical pickup, a damper base for use therein, and an adjusting method therefore, which are capable of easily correcting not only an angular displacement of an object lens in a radial direction that occurs on assembling and so on but also a position displacement of the object lens.

Other objects of this invention will become clear as the description proceeds.

On describing the gist of this invention, it is possible to be understood that an optical pickup comprises an object lens, a lens holder for holding the object lens, a damper base for supporting the lens holder through a plurality of suspension wires to allow the lens holder to shift up and down and right and left, and an actuator base including a supporting block for fixedly supporting the damper base by using a screw. According to an aspect of this invention, in the above-mentioned optical pickup, the damper base has an oval hole which allows the screw to pass therethrough.

On describing the gist of this invention, it is possible to be understood that a damper base is for use in an optical pickup comprising an object lens, a lens holder for holding the object lens, and an actuator base including a supporting block for fixedly supporting the damper base by using a screw. The damper base supports the lens holder through a plurality of suspension wires to allow the lens holder to shift up and down and right and left. According to an aspect of this invention, the afore-mentioned damper base has an oval hole which allows the screw to pass therethrough.

On describing the gist of this invention, it is possible to be understood that a method is for adjusting the afore-mentioned damper base. According to an aspect of this invention, the above-mentioned method comprising the steps of temporarily fixing the damper base on the supporting block by using the screw, of correcting a position displacement of the object lens in a radial direction in regard to an optical axis of a laser beam so as to make a center of the object lens coincide with the optical axis by sliding the damper base in a longitudinal direction of the oval hole, of correcting an angular displacement of the object lens in the radial direction in regard to the optical axis so as to make a central line of the object lens coincide with the optical axis by rotating the damper base the said screw, and of truly fixing the damper base on the supporting block by fastening the screw.

DESCRIPTION OF THE PREFERRED EMBODIMENT

Figure 1:
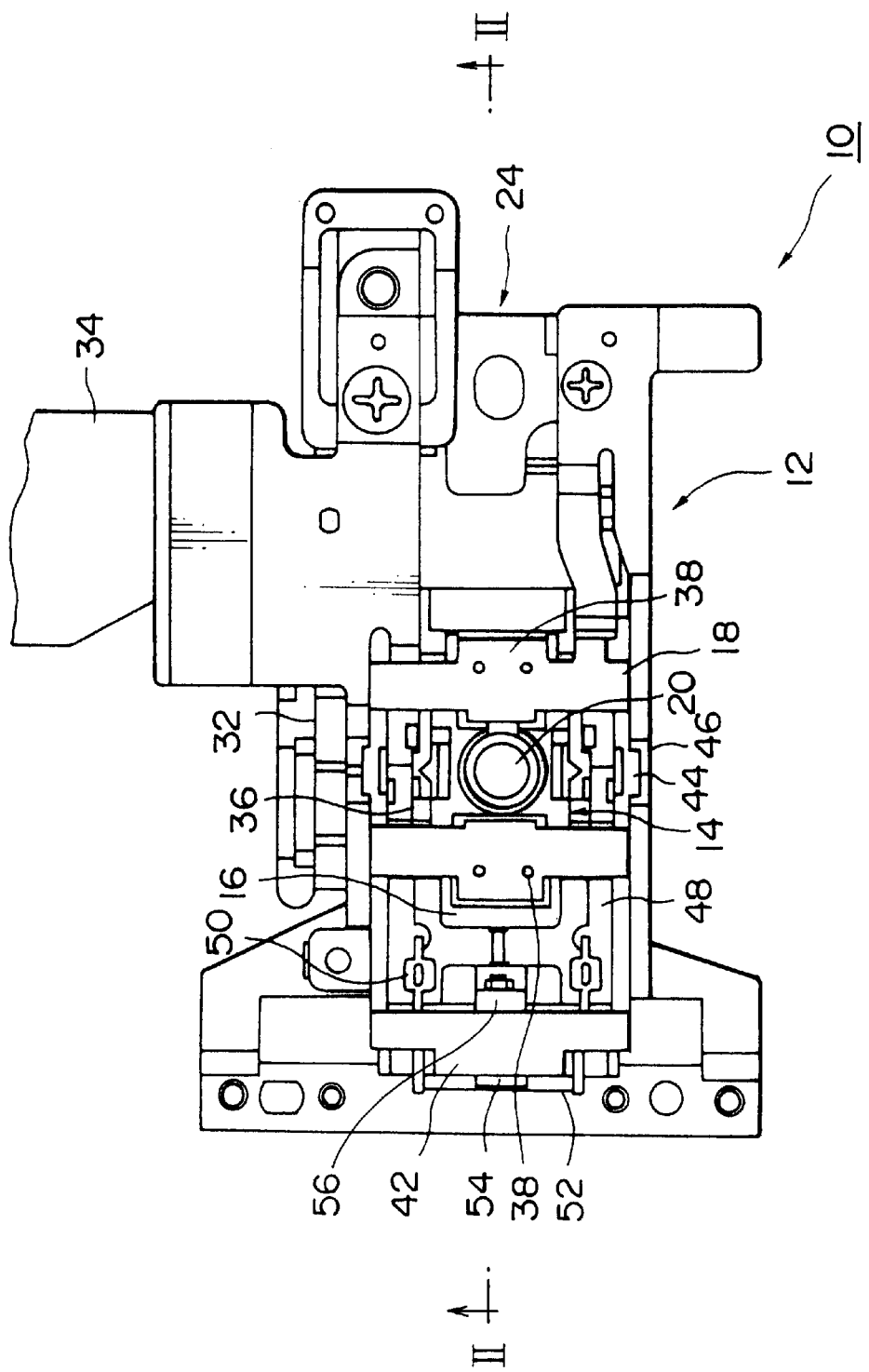
FIG. 1 is a plan view showing a conventional optical pickup.
Figure 2:
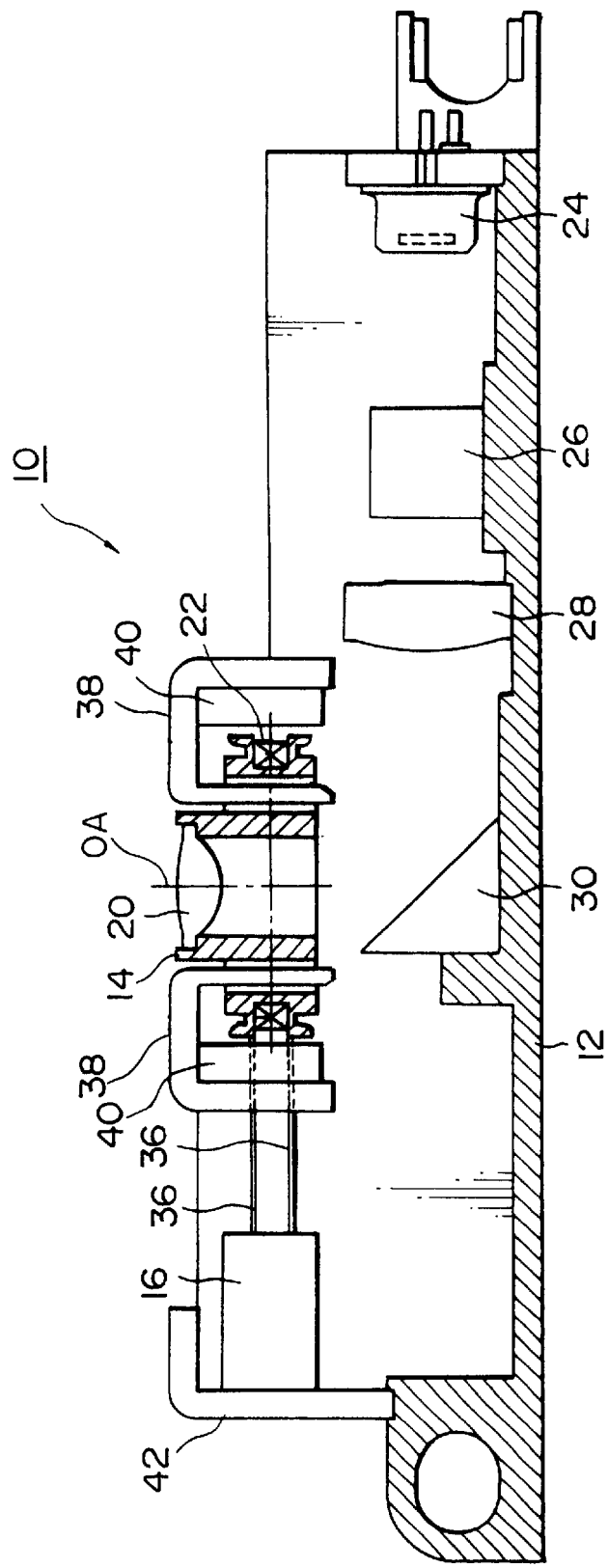
FIG. 2 is a cross-sectional view taken on line II—II on FIG. 1.

Referring to FIGS. 1 and 2, a conventional optical pickup 10 will be described at first in order to facilitate an understanding of the present invention. The illustrated optical pickup 10 is for use in an optical disc recording/reproducing apparatus such as a CD-R drive.

The optical pickup 10 comprises an optical base 12, a lens holder 14, a damper base 16, and an actuator base 18. The lens holder 14 holds an object lens 20 and is provided with a tracking coil (not shown) and a focusing coil 22. The actuator base 18 receives the lens holder 14 and the damper base 16.

The optical pickup 10 comprises a laser diode 24 serving as a laser light source for producing a laser beam. In addition, the optical pickup 10 further comprises an optical system which includes a diffraction grating (which will later become clear), a polarization beam splitter 26, a collimator lens 28, a quarter wavelength plate (which will later become clear), a rising mirror 30, the object lens 20, a sensor lens (which will later become clear), and a photodiode (which will later become clear). Produced by the laser diode 24, the laser beam passes through the diffraction grating, the polarization beam splitter 26, the collimator lens 28, the quarter wavelength plate, the rising mirror 30, and the object lens 20 and then is irradiated on an optical disc (CD-R) (which will later become clear). Reflected by the optical disc, a reflected laser beam passes through the object lens 20, the rising mirror 30, the quarter wavelength plate, the collimator lens 28, the polarization beam splitter 26, and the sensor lens and then is received in the photodiode. That is, the photodiode receives the reflected laser beam from the optical disc. In addition, arranged on an optical path of the laser beam, optical components and relationship there among will later be described with reference to FIG. 3.

The laser diode 24 and optical parts such as the polarization beam splitter 26 are held in or mounted on the optical base 12. In addition, the optical base 12 is slidably held in a chassis or frame (not shown) of the optical disc drive. The optical base 12 has a side surface on which a flexible circuit substrate 32 is fixed or mounted. The flexible circuit substrate 32 is connected to a flexible cable 34 through which the flexible circuit substrate 32 is electrically connected to other circuit elements (not shown) of the optical disc drive.

Between the lens holder 14 and the damper base 16 is connected by a plurality of suspension wires 36. A combination of the lens holder 14, the damper base 16, and the suspension wires 36 is received in the actuator base 18. The actuator base 18 has parts acting as yokes 38 on which permanent magnets 40 are fitted.

The actuator base 18 has a substantially frame structure made of metallic material. The substantially frame structure has an end serving as a receiving portion (not shown) for the damper base 16. The receiving portion comprises a supporting block 42 for fixing the damper base 16. The supporting block 42 is integrally formed with the actuator base 18. In addition, the substantially frame structure has both side walls which are provided with substantially semicircular projections 44. The substantially semicircular projections 44 are supported by supporting portions 46 provided in the optical base 12.

The damper base 16 is fitted with damper base covers 48 made of transparent resin material. The damper base covers 48 have rear portions serving as fixing portions 50 for fixing ends of the suspension wires 36. In a space between the damper base 16 and the damper base covers 48 is injected damping material (not shown) for suppressing vibrations of the suspension wires 36.

The damper base 16 has a rear wall which is provided with a flexible printed board 52 for connecting with end portions of the suspension wires 16 by solder. The damper base 16 is fixed between the both side walls of the actuator base 18 and the supporting block 42 with the damper base 16 inserted in a space therebetween.

The damper base 16 is attached on the supporting block 42 by a screw or bolt 54 and a nut 56 with the supporting block 42 put between the damper base 16 and the screw 54. The damper base 16 is rotatable about the screw 54 as a center. This is for skew adjustment.

Before the damper base 16 is fixed on the actuator base 18, the suspension wires 36 are attached to the damper base 16. That is, the lens holder 14 and the damper base 16 are received in and fixed on the actuator base 18 in a state of an assembly where the lens holder 14 and the damper base 16 are connected by the suspension wires 36.

Figure 3:
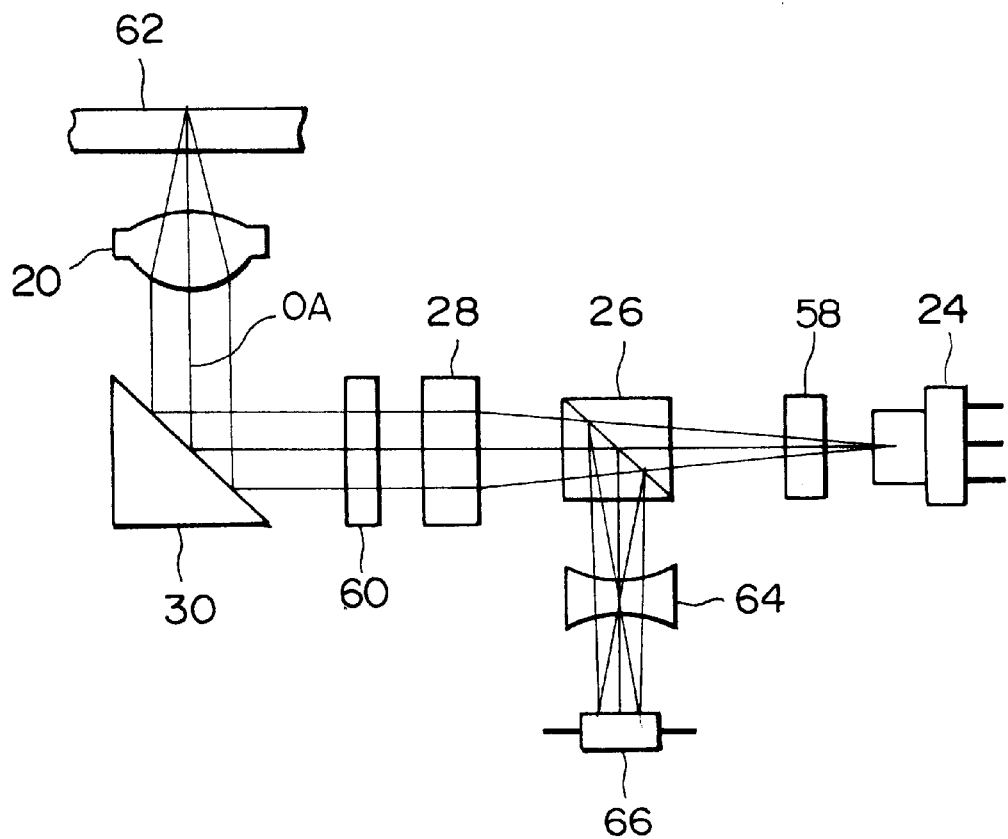
FIG. 3 is a schematic diagram of an optical system of the optical pickup illustrated in FIG. 1.

FIG. 3 illustrates the optical system of the optical pickup 10. The illustrated optical system comprises the laser diode 24, the diffraction grating depicted at 58, the polarization beam splitter 26, the collimator lens 28, the quarter wavelength plate depicted at 60, the rising mirror 30, the object lens 20, the optical disc depicted at 62, the sensor lens depicted at 64, and the photodiode depicted at 66.

Produced by the laser diode 24 to the left horizontally, one laser beam is separated by the diffraction grating 58 into three laser beams. The three laser beams passes through the polarization beam splitter 26 and thereafter converted by the collimator lens 28 into collimated laser beams. The collimated laser beams pass through the quarter wavelength plate 60 and then are orthogonally bent by the rising mirror 30 to go upwardly in an optical axis OA. Thereafter, the collimated laser beams are irradiated on the optical disc 62 through the object lens 20.

Reflected from the optical disc 62, reflected laser beams go downwardly, pass through the object lens 20, and are orthogonally bent by the rising mirror 30 to go to the right horizontally. The reflected laser beams pass the quarter wavelength plate 60 and are then converted by the collimator lens 28 into convergence laser beams. The convergence laser beams are orthgonally bent by the polarization beam splitter 26 to go in the forward direction horizontally. Thereafter, the convergence laser beams pass through the sensor lens 64 and are received in the photodiode 66.

Figure 4:
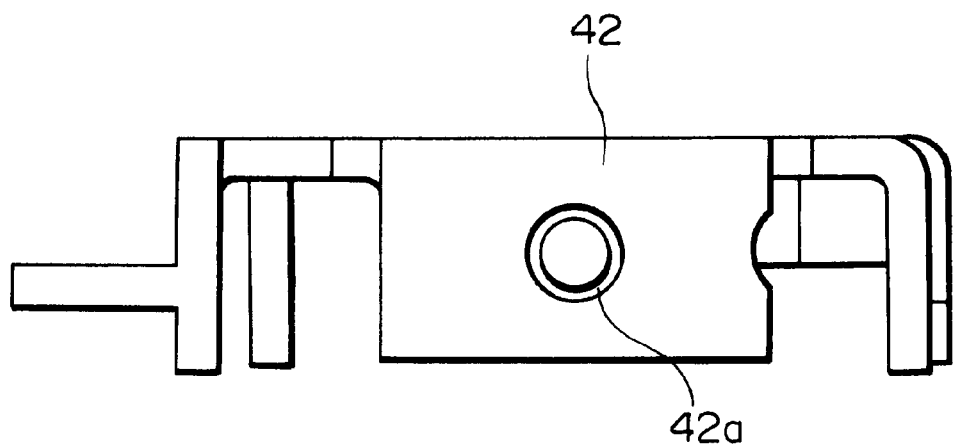
FIG. 4 is a rear elevation of a supporting block of an actuator base for use in the optical pickup illustrated in FIG. 1.
Figure 5:
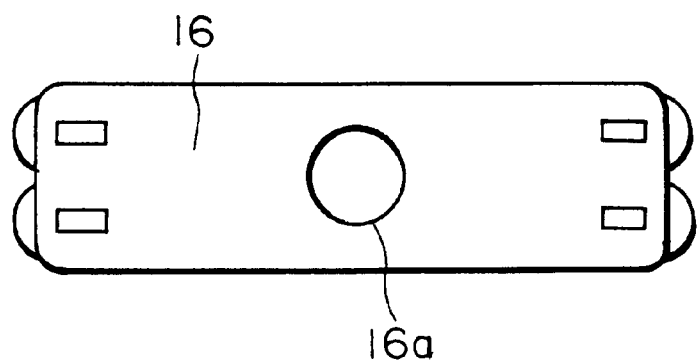
FIG. 5 is a rear elevation of a conventional damper base for use in the optical pickup illustrated in FIG. 1.

FIG. 4 is a rear elevation of the supporting block 42 and FIG. 5 is a rear elevation of the damper base 16. As shown in FIG. 4, the supporting block 42 has a threaded hole 42a. As shown in FIG. 5, the damper base 16 has a circular hole 16a which merely allows the above-mentioned screw 54 (FIG. 1) to pass therethrough.

Figure 6A:
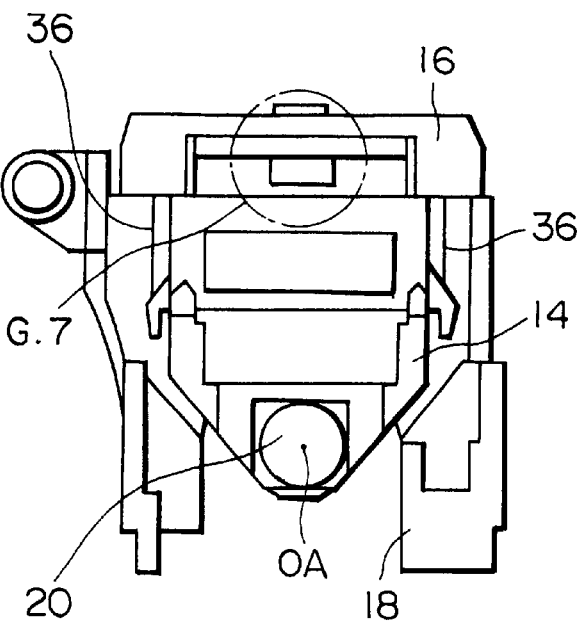
FIGS. 6A and 6B collectively show an assembled state where the conventional damper base is fastened on the supporting block of the actuator base in the optical pickup illustrated in FIG. 1.
Figure 6B:
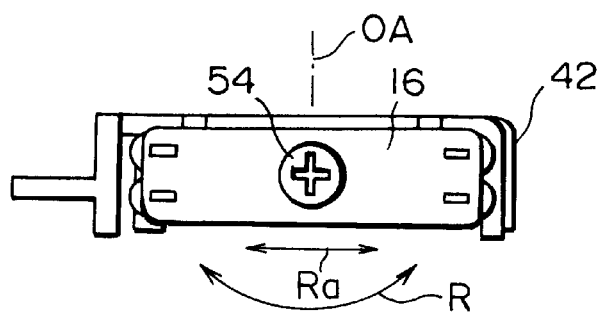
Figure 7:
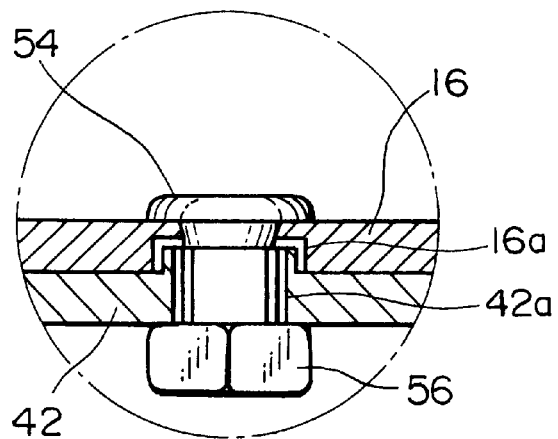
FIG. 7 is an enlarged sectional view of a portion of the assembled state depicted at FIG. 6A, which portion is labelled "FIG. 7" in FIG. 6A.

FIGS. 6A and 6B collectively show an assembled state where the damper base 16 is fastened on the supporting block 42 of the actuator base 18. FIG. 6A is a bottom view of the assembled state while FIG. 6B is a rear elevation of the assembled state. FIG. 7 is an enlarged sectional view of a portion of the assembled state depicted at FIG. 6A, which portion is labelled "FIG. 7" in FIG. 6A.

With this structure, it is possible to correct an angular displacement of the object lens 20 in a radial direction Ra in regard to the optical axis OA by fastening the damper base 16 to the supporting block 42 with the damper base suitably rotated about the screw 54 in a direction depicted at an arrow R as illustrated in FIG. 6B.

The above-mentioned damper base 16 merely can adjust an angle of the object lens 20 in the radial direction Ra in regard to the optical axis OA. However, it is actually necessary not only to correct the angular displacement of the object lens 20 in the radial direction Ra that occurs on assembling and so on but also to correct a position displacement of the object lens 20 in the radial direction Ra, as mentioned in the preamble of the instant specification. This assemble requires a precision of about tens of microns.

Figure 8:
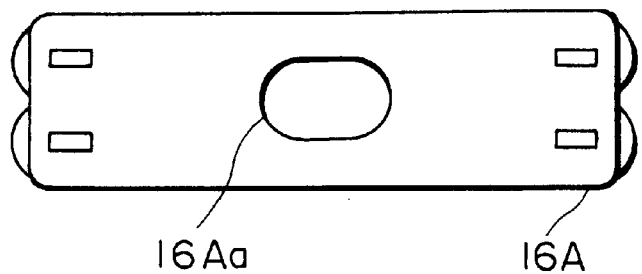
FIG. 8 is a rear elevation of a damper base according to a preferred embodiment of this invention.

Referring to FIG. 8, the description will proceed to a damper base 16A according to a preferred embodiment of this invention. As shown In FIG. 8, the damper base 16A has an oval hole 16A*a* in lieu of the circular hole 16*a* as illustrated In FIG. 5. With this structure, it is possible for the damper base 16A to carry out not only an angular adjustment of the object lens 20 (FIG. 1) in the radial direction Ra but also a position adjustment of the object lens 20 In the radial direction Ra In the manner which will presently be described.

Figure 9A:
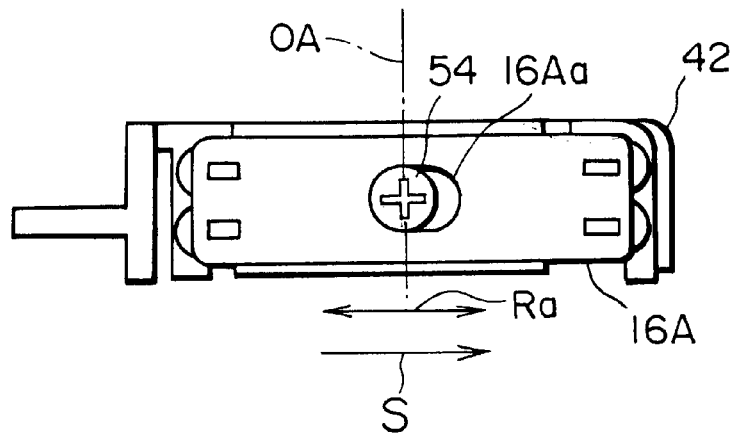
FIGS. 9A and 9B collectively show views for use in describing a procedure for adjusting the damper base illustrated in FIG. 8.
Figure 9B:
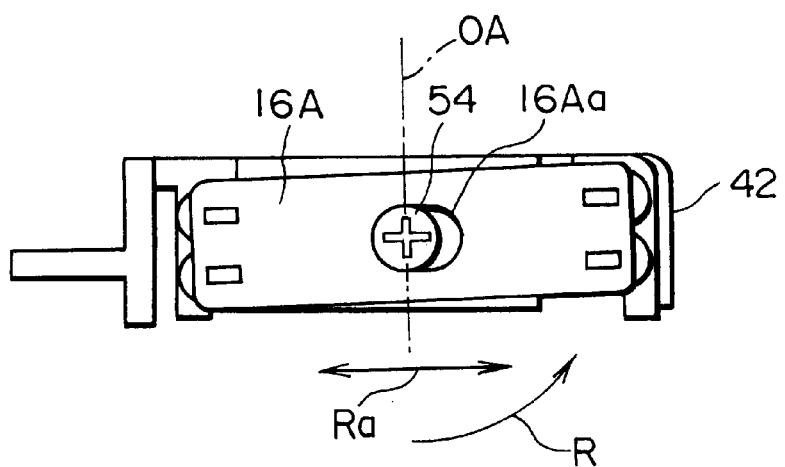

Referring now FIGS. 9A and 9B, the description will proceed to a procedure for adjusting the damper base 16A.

At first, the damper base 16A is temporarily fixed on the supporting block 42 by using the screw 54. Subsequently, as shown in FIG. 9A, a position displacement of the object lens 20 (FIG. 1) in the radial direction Ra in regard to an optical axis OA of a laser beam is corrected by sliding the damper base 16A in a longitudinal direction S of the oval hole 16A*a* to make a center of the object lens 20 coincide with the optical axis OA. Thereafter, as shown in FIG. 9B, an angular displacement of the object lens 20 in the radial direction Ra in regard to the optical axis OA is corrected by rotating the damper base 16A about the screw 54 as depicted at an arrow R to make a central line of the object lens 20 coincide with the optical axis AS. Finally, the damper base is truly fixed on the supporting block 42 by fastening the screw 54.

As a result, it is possible in the damper base 16A to easily carry out not only the angular adjustment of the object lens 20 in the radial direction Ra but also the position adjustment of the object lens 20 in the radial direction Ra although it is possible in the conventional damper base 16 to carry out only the angular adjustment of the object lens 20 in the radial direction Ra.

While this invention has thus far been described in conjunction with preferred embodiments thereof, it will now be readily possible for those skilled in the art to put this invention into various other manners.

What is claimed is:

1. An optical pickup comprising an object lens, a lens holder for holding said object lens, a damper base for supporting said lens holder through a plurality of suspension wires to allow said lens holder to shift up and down and right and left, and an actuator base including a supporting block for fixedly supporting said damper base by using a screw, wherein said damper base has an oval hole which allows said screw to pass therethrough and wherein said damper base is rotated about said screw to correct an angular displacement of said object lens in the radial direction in regard to an optical axis so as to make a central line of said object lens coincide with the optical axis.

2. A damper base for use in an optical pickup comprising an object lens, a lens holder for holding said object lens, and an actuator base including a supporting block for fixedly supporting said damper base by using a screw, said damper base supporting said lens holder through a plurality of suspension wires to allow said lens holder to shift up and down and right and left, wherein said damper base has an oval hole which allows said screw to pass therethrough and wherein said damper base is rotated about said screw to correct an annular displacement of said object lens in the radial direction in regard to an optical axis so as to make a central line of said object lens coincide with the optical axis.

3. A method of adjusting a damper base for use in an optical pickup comprising an object lens, a lens holder for holding said object lens, and an actuator base including a supporting block for fixedly supporting said damper base by using a screw, said damper base supporting said lens holder through a plurality of suspension wires to allow said lens holder to shift up and down and right and left, said damper base has an oval hole which allows said screw to pass therethrough, said method comprising the steps of:

temporarily fixing said damper base on said supporting block by using said screw;

correcting a position displacement of said object lens in a radial direction in regard to an optical axis of a laser beam so as to make a center of said object lens coincide with the optical axis by sliding said damper base in a longitudinal direction of said oval hole;

correcting an angular displacement of said object lens in the radial direction in regard to the optical axis so as to make a central line of said object lens coincide with the optical axis by rotating said damper base about said screw; and truly fixing said damper base on said supporting block by fastening said screw.

* * * * *